(12) United States Patent
Fujiki et al.

(10) Patent No.: US 10,497,933 B2
(45) Date of Patent: Dec. 3, 2019

(54) CATHODE ACTIVE MATERIAL, METHOD OF PREPARING THE CATHODE ACTIVE MATERIAL, AND ALL-SOLID-STATE BATTERY INCLUDING THE SAME

(71) Applicant: Samsung Electronics Co., Ltd., Suwon-si, Gyeonggi-do (KR)

(72) Inventors: Satoshi Fujiki, Yokohama (JP); Tomoyuki Shiratsuchi, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 275 days.

(21) Appl. No.: 15/466,409

(22) Filed: Mar. 22, 2017

(65) Prior Publication Data

US 2018/0090752 A1 Mar. 29, 2018

(30) Foreign Application Priority Data

Sep. 23, 2016 (KR) .................. 10-2016-0122384

(51) Int. Cl.
| | | |
|---|---|---|
| *H01M 4/36* | (2006.01) | |
| *H01M 4/58* | (2010.01) | |
| *H01M 10/0562* | (2010.01) | |
| *H01M 4/485* | (2010.01) | |
| *H01M 4/62* | (2006.01) | |
| *H01M 10/052* | (2010.01) | |
| *C01B 25/45* | (2006.01) | |
| *H01M 4/02* | (2006.01) | |

(52) U.S. Cl.
CPC ............. *H01M 4/364* (2013.01); *C01B 25/45* (2013.01); *H01M 4/366* (2013.01); *H01M 4/485* (2013.01); *H01M 4/5825* (2013.01); *H01M 4/62* (2013.01); *H01M 10/052* (2013.01); *H01M 10/0562* (2013.01); *H01M 2004/028* (2013.01); *H01M 2300/0068* (2013.01)

(58) Field of Classification Search
CPC .... H01M 4/364; H01M 4/5825; H01M 4/485; H01M 4/366; H01M 4/62; H01M 10/0562; H01M 10/052; H01M 2004/028; H01M 2300/0068
See application file for complete search history.

(56) References Cited

U.S. PATENT DOCUMENTS

| | | | |
|---|---|---|---|
| 4,675,260 | A | 6/1987 | Sakurai et al. |
| 2014/0093786 | A1 | 4/2014 | Ito et al. |
| 2014/0246619 | A1 | 9/2014 | Hautier et al. |
| 2016/0049646 | A1 | 2/2016 | Fujiki et al. |

FOREIGN PATENT DOCUMENTS

| | | |
|---|---|---|
| CN | 102723489 A | 10/2012 |
| JP | 2754615 B2 | 3/1998 |
| JP | 2767853 B2 | 4/1998 |
| JP | 4991662 B2 | 5/2012 |
| JP | 2013020741 A | 1/2013 |
| JP | 2014116149 A | 6/2014 |
| JP | 201642417 A | 3/2016 |
| JP | 2016508946 A | 3/2016 |
| WO | 2013175991 A1 | 11/2013 |

OTHER PUBLICATIONS

Wachter, "From Amorphous to Crystalline via Vitreous Cathode Materials for Rechargeable Lithium Ion-Batteries", A dissertation submitted to the Eth Zurich, 2012, p. 1-174.

*Primary Examiner* — Laura Weiner
(74) *Attorney, Agent, or Firm* — Cantor Colburn LLP

(57) ABSTRACT

A cathode active material including a first composite oxide represented by Formula (1):

$$xV_2O_5 \cdot Li_3PO_4 \qquad (1)$$

wherein, in Formula 1, x satisfies $2 < x \leq 10$.

20 Claims, 4 Drawing Sheets

10 μm

1 μm

CATHODE ACTIVE MATERIAL, METHOD OF PREPARING THE CATHODE ACTIVE MATERIAL, AND ALL-SOLID-STATE BATTERY INCLUDING THE SAME

CROSS-REFERENCE TO RELATED APPLICATION

This application claims priority to and the benefit of Korean Patent Application No. 10-2016-0122384, filed on Sep. 23, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode active material, a method of preparing the cathode active material, and an all-solid-state battery including the same.

2. Description of the Related Art

A lithium ion secondary battery has a high charge/discharge capacity, a high operation potential, and excellent charge/discharge cycle characteristics. Thus the demand for their use in portable information terminals, portable electronic devices, and small-sized electric power storage devices, as well as in motor cycles, electric vehicles, and hybrid electric vehicles having a motor as a power source, has increased. The battery uses an electrolyte solution that includes a lithium salt in an organic solvent. However, the non-aqueous electrolyte solution is both flammable and capable of leakage. Therefore, in recent years, developing an all-solid-state lithium battery having a solid electrolyte formed of an inorganic material has become a priority. A solid electrolyte is attractive because it may be less flammable and less susceptible to leakage.

A sulfide or an oxide may be used as a solid electrolyte, and sulfide solid electrolytes provide lithium ion conductivity. When cathode active materials such nickel cobalt aluminum acid ($LiNi_{0.8}Co_{0.15}Al_{0.05}O_2$, also referred to as "NCA") or lithium cobalt oxide ($LiCoO_2$, also referred to as "LCO") are used with these solid electrolytes, reactions can occur between the cathode active material and the solid electrolyte at their interface during charge/discharge cycles. An interface resistance is thus produced and lithium ion conductivity deteriorates. Additionally, the charging voltage using these materials is limited to 4.0 V or less. Other cathode active materials for use in an all-solid-state battery include vanadium pentoxide ($V_2O_5$) and phosphorus pentoxide ($P_2O_5$). However, capacity deterioration may still occur with these materials during repeated charge/discharge processes.

Furthermore, the charging voltage of a lithium ion secondary battery having an electrolyte solution may be 4.2 V or higher, so the energy density of an all-solid-state lithium battery needs to be improved.

A cathode active material having a capacity, charging voltage, and capacity retention that are comparable to an aqueous-based lithium ion secondary battery is desirable. Therefore, there remains a need for a cathode active material that is capable of improving discharge capacity and cycle characteristics for use in an all-solid-state lithium battery that has a solid electrolyte.

SUMMARY

Provided is an all-solid-state secondary battery having an improved discharge capacity and cycle characteristics, the all-solid-state secondary battery including a cathode active material, and a cathode including the cathode active material.

Additional aspects will be set forth in part in the description which follows and, in part, will be apparent from the description, or may be learned by practice of the presented embodiments.

According to an embodiment, a cathode active material includes a first composite oxide represented by Formula (1):

$$xV_2O_5 \cdot Li_3PO_4 \qquad (1)$$

wherein, in Formula (1), x satisfies $2<x\leq10$.

According to another embodiment, a method of preparing a cathode active material includes contacting vanadium oxide and lithium phosphoric acid to prepare a mixture; and milling the mixture to obtain a composite oxide to prepare the cathode active material.

According to another embodiment, an all-solid-state secondary battery includes a cathode including the cathode active material; an anode; and a solid electrolyte layer disposed between the cathode and the anode.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
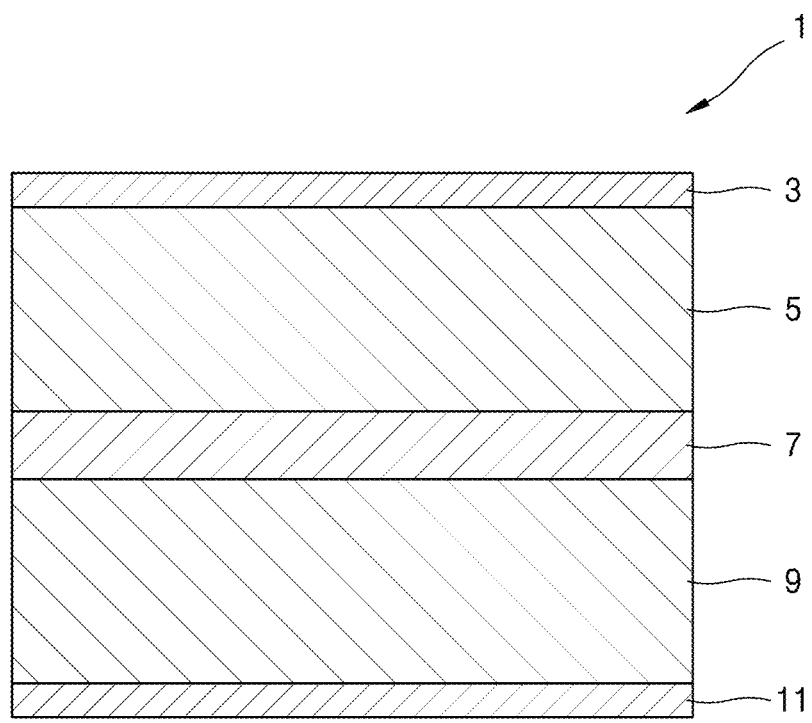
FIG. 1 is a cross-sectional view illustrating an exemplary embodiment of a structure of an all-solid-state secondary battery.

Reference will now be made in detail to embodiments of a cathode active material, a method of preparing a cathode active material, and an all-solid-state battery including a cathode including the cathode active material, embodiments of which are illustrated in the accompanying drawings, wherein like reference numerals refer to like elements throughout. In this regard, the disclosed embodiments may have different forms and should not be construed as being limited to the descriptions set forth herein. Accordingly, the embodiments are described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list.

In addition, unless explicitly described to the contrary, the word "comprise" and variations such as "comprises" or "comprising", will be understood to imply the inclusion of stated elements but not the exclusion of any other elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "is a Group 3 to Group 15 element" means a Group 3 element, a Group 4 element, a Group 5 element, a Group 6 element, a Group 7 element, a Group 8 element, a Group 9 element, a Group 10 element, a Group 11 element, a Group 12 element, a Group 13 element, a Group 14 element, a Group 15 element, or a combination including at least one of the foregoing.

"Group" means a group of the periodic table of the elements according to the International Union of Pure and Applied Chemistry ("IUPAC") 1-18 Group classification system.

Cathode Active Material

A cathode active material according to an embodiment may include a first composite oxide represented by Formula (1):

$$xV_2O_5 \cdot Li_3PO_4 \qquad (1)$$

In Formula (1), x satisfies $2 < x \leq 10$.
In Formula (1), x satisfies $2 < x < 10$, preferably $3 \leq x < 10$.

Vanadium pentoxide ($V_2O_5$) is known as having a theoretical capacity that is about twice the capacity of each of lithium cobalt oxide ($LiCoO_2$, also referred to as "LCO") and nickel cobalt aluminum acid ($LiNi_{0.8}Co_{0.15}Al_{0.05}O_2$, also referred to as "NCA") but has a problem of significant capacity deterioration upon charging/discharging cycles. In this regard, the present inventors have examined a method for reducing the problem of capacity deterioration while maintaining a high capacity of vanadium pentoxide, and as a result, have developed a composite oxide in the form of solid vanadium pentoxide particles and solid electrolyte particles.

Without being bound by theory, the capacity deterioration of the cathode active material including the composite oxide may be significantly decreased by using lithium phosphate ($Li_3PO_4$) as the solid electrolyte particles included in the composite oxide and controlling a molar ratio of the vanadium pentoxide particles to the lithium phosphate particles.

Additionally, and without being bound by theory, when a molar ratio of the vanadium pentoxide particles to the lithium phosphate particles in a mixture thereof is 3:1, the capacity deterioration significantly decreases as compared to the case when the molar ratio is 2:1. In this manner, when a proportion of vanadium pentoxide increases, it is deemed that the capacity deterioration does not occur because lithium phosphate has lithium ion conductivity and is chemically stable. When a molar ratio of vanadium pentoxide particles to lithium phosphate particles when mixed is 3:1, surfaces of vanadium pentoxide particles are thinly and evenly coated with lithium phosphate. Therefore, it is deemed that a reaction between the vanadium pentoxide particles and the solid electrolyte particles, for example lithium phosphate particles, may be suppressed, and thus capacity deterioration may be prevented. When a molar ratio of the vanadium pentoxide particles to the lithium phosphate particles is greater than 10:1, the remaining vanadium pentoxide particles that are not coated with lithium phosphate react with solid electrolyte particles, and thus, may result in significant capacity deterioration. When a molar ratio of the vanadium pentoxide particles to lithium phosphate particles in the composite oxide is controlled to a range of greater than about 2:1 to about 10:1 or less, the capacity deterioration during charging/discharging may be reduced, for example prevented, and thus an all-solid-state secondary battery using a cathode including the composite oxide may have a high capacity and high lifespan characteristics.

The cathode active material may further include a lithium metal oxide compound represented by Formula (1A):

$$Li_aM_bO_c \qquad (1A).$$

In Formula (1A), M is a Group 3 to Group 15 element or a combination comprising at least one of a Group 3 to Group 15 element, and a, b, and c respectively satisfy $1 \leq a \leq 2$, $0 < b \leq 1$, and $1 < c \leq 4$.

In an embodiment, the cathode active material may include a second composite oxide that is represented by Formula (2):

$$y(xV_2O_5 \cdot Li_3PO_4) \cdot (100-y)Li_aM_bO_c \qquad (2).$$

In Formula (2), M is a Group 3 to Group 15 element or a combination comprising at least one of a Group 3 to Group 15 element, and x, y, a, b, and c respectively satisfy $2 < x \leq 10$, $95 \leq y < 100$, $1 \leq a \leq 2$, $0 < b \leq 1$, and $1 < c \leq 4$.

In Formula (2), M may be B, Zr, Nb, Mo, W, or a combination including at least one of the foregoing, but embodiments are not limited thereto.

For example, the second composite oxide represented by Formula (2) is a composite oxide represented by $y(xV_2O_5 \cdot Li_3PO_4) \cdot (100-y)LiNbO_3$, $y(xV_2O_5 \cdot Li_3PO_4) \cdot (100-y)Li_2MoO_4$, $y(xV_2O_5 \cdot Li_3PO_4) \cdot (100-y)LiBO_2$, $y(xV_2O_5 \cdot Li_3PO_4) \cdot (100-y)Li_2WO_4$, or $y(xV_2O_5 \cdot Li_3PO_4) \cdot (100-y)Li_2ZrO_3$ wherein x and y respectively satisfy $2 < x \leq 10$ and $95 \leq y < 100$.

For example, the second composite oxide represented by Formula (2) may be a composite oxide represented by $95(4V_2O_5 \cdot Li_3PO_4) \cdot 5LiNbO_3$, $95(4V_2O_5 \cdot Li_3PO_4) \cdot 5Li_2MoO_4$, $95(4V_2O_5 \cdot Li_3PO_4) \cdot 5LiBO_2$, $95(4V_2O_5 \cdot Li_3PO_4) \cdot 5Li_2WO_4$, $99(4V_2O_5 \cdot Li_3PO_4) \cdot 1Li_2MoO_4$, or $99(4V_2O_5 \cdot Li_3PO_4) \cdot 1Li_2ZrO_3$.

When a portion of the first composite oxide is substituted with the second composite oxide, a resistance increase at an interface between a sulfide-based solid electrolyte layer and a cathode may be suppressed, and, as a result, ion conductivity may improve, which may result in an increase in capacity.

A cathode active material according to another embodiment may include a third composite oxide including a core and a coating layer disposed on the core. The core may include the first composite oxide represented by Formula (1), and the coating layer may include a Group 3 to Group 15 element or a combination including at least one of a Group 3 to Group 15 element.

The coating element included in the coating layer may be Sc, Y, Ti, Zr, Hf, Rf, V, Nb, Ta, Db, Cr, Mn, W, Sg, Mn, Tc, Re, Fe, Ru, Os, Hs, Co, Rh, Ir, Mt, Ni, Pd, Pt, Ds, Cu, Ag, Au, Rg, Zn, Cd, Hg, Cn, B, Al, Ga, In, Ti, C, Si, Ge, Sn, Pb, N, P, As, Sb, or a combination including at least one of the foregoing.

For example, the coating element may include B, Zr, Nb, Mo, W, or a combination including at least one of the foregoing, but embodiments are not limited thereto. For example, the coating element of the coating layer may include Zr. In another embodiment, the coating element is not limited thereto.

The coating layer may include a coating element compound which is an oxide, a hydroxide, an oxyhydroxide, an oxycarbonate, or a hydroxycarbonate of the coating element. For example, the coating layer may include an oxide of a coating element.

The compound included in the coating layer may be amorphous or crystalline.

In another embodiment, the coating layer may include a compound represented by Formula (1B):

$$Li_aM_bO_c \qquad (1B)$$

In Formula (1B), M may be a Group 3 to Group 15 element or a combination including at least one of a Group 3 to Group 15 element, and a, b, and c respectively may satisfy $1 \leq a \leq 2$, $0 < b \leq 1$, and $1 < c \leq 4$.

In an embodiment, in Formula (1B), M may include B, Zr, Nb, Mo, or W, or a combination including at least one of the foregoing, but embodiments are not limited thereto.

The coating layer may include $LiNbO_3$, $Li_2MoO_4$, $LiBO_2$, $Li_2WO_4$, $Li_2ZrO_3$, or a combination including at least one of the foregoing, but embodiments are not limited thereto. For example, the coating layer may include $Li_2ZrO_3$.

An amount of the coating layer may be in a range of about 0.1 weight percent (wt %) to about 10 wt %, for example, in a range of about 0.5 wt % to about 10 wt %, for example, about 1 wt % to about 10 wt %, for example, about 0.1 wt % to about 9 wt %, or, for example, about 0.1 wt % to about 5 wt %, based on the total weight of the third composite oxide, but embodiments are not limited thereto, and may include any subrange within these ranges.

When the amount of the coating layer is within these ranges, resistance at an interface between the cathode active material layer and the solid electrolyte layer may be decreased.

An average particle diameter of the first composite oxide may be in a range of about 0.1 micrometer (μm) to about 10 μm, for example, about 0.1 μm to about 5 μm, or, for example, about 1 μm to about 10 μm, but embodiments are not limited thereto, and may include any subrange within these ranges.

In an embodiment, a discharge capacity at the $2^{nd}$ cycle of a lithium battery including the first composite oxide is 270 milliampere hours per gram (mAh/g) or greater.

Method of Preparing Cathode Active Material

A method of preparing a cathode active material is not particularly limited, and, for example, a cathode active material may be prepared as follows.

According to another embodiment, a method of preparing a cathode active material includes contacting a vanadium oxide, for example vanadium pentoxide ($V_2O_5$), and lithium phosphoric acid, for example lithium phosphate ($Li_3PO_4$), to prepare a mixture; and milling the mixture to obtain a composite oxide to prepare the cathode active material. In an embodiment, the milling is mechanical milling.

In an embodiment, a molar ratio of vanadium pentoxide to lithium phosphate may be in a range of greater than about 2:1 to about 10:1 or less, for example, greater than 2:1 to less than 10:1, or, for example, about 3:1 or greater to less than about 10:1, but embodiments are not limited thereto, and may include any molar ratio within these ranges.

Also, the mixture may further include the compound represented by Formula (1A):

$$Li_aM_bO_c, \qquad (1A)$$

In Formula (1A), M is a Group 3 to Group 15 element or a combination including at least one of a Group 3 to Group 15 element, and a, b, and c respectively satisfy $1 \leq a \leq 2$, $0 < b \leq 1$, and $1 < c \leq 4$.

In an embodiment, the preparation method may further include contacting, for example adding to and/or mixing with, a coating solution and the composite oxide, wherein the coating solution comprises a compound of Formula (1B):

$$Li_aM_bO_c \qquad (1B),$$

wherein, in Formula (1B), M is a Group 3 to Group 15 element or a combination including at least one of a Group 3 to Group 15 element, and a, b, and c respectively satisfy 1≤a≤2, 0<b≤1, and 1<c≤4, to obtain a mixed solution; and drying and heat-treating the mixed solution under oxidative conditions, for example in the presence of oxygen or the ambient atmosphere, to obtain a $Li_aM_bO_c$-coated composite oxide.

The heat-treating may be performed at a temperature in a range of about 300° C. to about 500° C., for example, about 300° C. to about 450° C., or for example, 300° C. to about 400° C. For example, the heat-treating may be performed at a temperature of about 350° C. In an embodiment, the heat-treating may be performed for, for example, about 1 hour. In this regard, a cathode active material having a lithium metal oxide on a surface thereof may be obtained.

All-solid-state Secondary Battery

According to another embodiment, provided is an all-solid-state secondary battery including a cathode including the cathode active material according to an embodiment; an anode; and a solid electrolyte layer disposed between the cathode and the anode.

Cathode

A cathode may be prepared as follows. In an embodiment, a cathode active material, a solid electrolyte, a conducting agent, a binder, and a solvent are combined, for example mixed, to prepare a cathode active material composition. In an embodiment, the cathode active material composition may be coated, for example directly coated, and dried on a current collector, for example an aluminum current collector, to prepare a cathode plate on which a cathode active material layer is formed. In an embodiment, the cathode active material composition may be formed, for example cast, on a separate support to form a cathode active material film, which may then be separated from the support and applied to, for example laminated on, a current collector, for example an aluminum current collector, to prepare a cathode plate on which a cathode active material layer is formed.

Examples of the conducting agent may include carbon black, graphite particulates, natural graphite, artificial graphite, acetylene black, Ketjen black, and carbon fibers; carbon nanotubes; metal powder, metal fibers, and metal tubes of copper, nickel, aluminum, and silver; and a conductive polymer such as a polyphenylene derivative, but embodiments are not limited thereto, and any suitable material available as a conducting agent, including those available in the art, may be used.

Examples of the binder may include a vinylidene fluoride/hexafluoropropylene copolymer, polyvinylidene fluoride (PVDF), polyacrylonitrile, polymethylmethacrylate, polytetrafluoroethylene (PTFE), mixtures thereof, and a styrene-butadiene rubber polymer, but embodiments are not limited thereto. Any suitable material available as a binding agent, including those available in the art, may be used. Examples of the solvent may include toluene, xylene, and hexane, but embodiments are not limited thereto. Any suitable material available as a solvent, including those available in the art, may be used.

In an embodiment, a plasticizing agent may be further added to the cathode active material composition to form pores in the electrode plate.

The amounts of the cathode active material, the conducting agent, the binder, and the solvent may be in ranges suitable for lithium batteries. In an embodiment, at least one of the conducting agent, the binder, and the solvent may be omitted according to the use and the structure of the lithium battery.

Anode

An anode may include lithium or a lithium alloy. Examples of the lithium alloy may include aluminum-lithium, indium-lithium, tin-lithium, lead-lithium, silver-lithium, and copper-lithium.

For example, the anode may include an aluminum-lithium alloy. The anode including the aluminum-lithium alloy may be prepared by putting a substantially pure aluminum bar into an electrolyte containing lithium ions to charge lithium ions into the aluminum bar, for example in the manner of dispersion.

In an embodiment, a lithium alloy used in the anode may be prepared by using another suitable technique, including those known in the art. Other suitable anode materials may be used, including those available in the art.

Solid Electrolyte Layer

A solid electrolyte layer includes a sulfide-based solid electrolyte ("solid electrolyte"). The sulfide-based solid electrolyte may at least include sulfur (S) and lithium (Li), and may further include phosphorus (P), silicon (Si), boron (B), aluminum (Al), germanium (Ge), zinc (Zn), gallium (Ga), indium (In), one or more halogen elements, or a combination including at least one of the foregoing. For example, the sulfide-based solid electrolyte may include S and Li, and may further include Si, P, B, or a combination including at least one of the foregoing. The solid electrolyte that satisfies these conditions, i.e., the sulfide-based solid electrolyte, has lithium ion conductivity higher than that of other inorganic compounds.

An example of the sulfide-based solid electrolyte may include $Li_2S$—$P_2S_5$. The solid electrolyte may be obtained by heating $Li_2S$ and $P_2S_5$ to a melting temperature or greater, mixing the melted $Li_2S$ and $P_2S_5$ at a predetermined ratio to obtained a melted mixture, maintaining the melted mixture for a predetermined time, and rapidly cooling the mixture. In an embodiment, a powder of $Li_2S$ and $P_2S_5$ may be by treating the cooled mixture by using a milling method, for example a mechanical milling method. In another embodiment, a suitable sulfide-based solid electrolyte may be prepared using a suitable method, including those solid electrolytes and methods available in the art.

EXAMPLES

Example 1

Preparation of Cathode Active Material

Vanadium pentoxide ($V_2O_5$) and lithium phosphate ($Li_3PO_4$) are mechanically milled at a molar ratio of $V_2O_5$:$Li_3PO_4$=3:1 to obtain a cathode active material.

Preparation of Sulfide-based Solid Electrolyte

Lithium sulfide ($Li_2S$) and diphosphorus pentasulfide ($P_2S_5$) are mechanically milled at a molar ratio of Li:P=8:2 to obtain a sulfide-based solid electrolyte.

Preparation of Cell for Test

An all-solid-state secondary battery is prepared in an inert gas atmosphere as follows.

The cathode active material, the sulfide-based solid electrolyte, and a carbonaceous material, as a conducting material, were homogenously mixed at a mixing ratio of 44/49/7 (wt %) by using a mortar to obtain a cathode mixture. 30 mg of the cathode mixture thus obtained was inserted into a molding jig and press-molded under a pressure of 2 tons per square centimeter (ton/$cm^2$) to prepare a cathode mixture in the form of a pellet.

The pelletized cathode mixture was disposed on a stainless steel current collector to prepare a cathode layer.

150 mg of the sulfide-based solid electrolyte powder was inserted into a molding jig and press-molded under a pressure of 2 ton/cm², and thus a solid electrolyte layer was prepared. The cathode layer was inserted into the same molding jig and press-molded under a pressure of 2 ton/cm², and thus the solid electrolyte layer and the cathode layer were integrated as one body.

Then, a Li metal foil having a thickness of 100 μm, as an anode mixture, was inserted to the same molding jig so that the solid electrolyte layer may contact the cathode layer and the anode layer, and press-molded under a pressure of 3 ton/cm² and thus the solid electrolyte layer, the cathode layer, and the anode layer were integrated into one body. In this manner, a test cell was obtained.

Examples 2 to 4

Using a molar ratio of $V_2O_5$ to $Li_3PO_4$ of 4:1, 5:1, and 10:1, respectively, the test cells were prepared in the same manner as in Example 1.

Examples 5 to 9

A lithium metal oxide was added to Example 2 ($V_2O_5$:$Li_3PO_4$=4:1), and the test cells were prepared in the same manner as in Example 1.

Example 10

A coating treatment was performed with a lithium metal oxide on Example 2 ($V_2O_5$: $Li_3PO_4$=4:1) as follows.
Coating treatment process
0.08 g of a 10% lithium methoxide in methanol solution and 0.03 g of zirconium(IV) propoxide were mixed and dissolved in an isopropanol solution for 30 minutes. 1 g of the cathode active material prepared in Example 2 was added to the solution. The mixed solution thus obtained was heated to a temperature of 40° C. and stirred to evaporate the solvent until dry. The drying process was performed while sonicating the mixed solution. In this regard, a reaction precursor of a lithium-zirconium oxide was deposited on a surface of the cathode active material. In addition, the lithium-zirconium oxide precursor deposited on the surface of the cathode active material was heat-treated in an oxygen atmosphere at 350° C. for 1 hour. As a result, the coating cathode active material was coated with 1 mol % of lithium-zirconium oxide.

Comparative Example 1

A test cell was prepared in the same manner as in Example 1, except that lithium phosphate was not used.

Comparative Example 2

A test cell was prepared in the same manner as in Example 1, except that a molar ratio of $V_2O_5$:$Li_3PO_4$ was 2:1.

Comparative Example 3

A test cell was prepared in the same manner as in Example 1, except a molar ratio of $V_2O_5$:$Li_3PO_4$=4:1 was used as in Example 2, and $P_2O_5$ was added thereto.
Cycle Lifespan Test The test cell thus obtained was used to perform a 0.05 C constant-current charge/discharge cycle test at room temperature (25° C.). In particular, the test cell underwent two charge/discharge cycles, each of the cycles including discharging the test cell with a constant current of 0.13 milliamperes (mA) until a lower-limit voltage of 1.5 volts (V) was reached and then charging with a constant current of 0.13 mA until a voltage of 4.0 V was reached at 25° C. In addition, a percentage of a discharge capacity at the $2^{nd}$ cycle ("secondary discharge capacity") to a discharge capacity (an initial capacity) at the $1^{st}$ cycle ("primary discharge capacity") was defined as a discharge capacity retention. The discharge capacity retention is a parameter that represents cycle characteristics, and as the discharge capacity retention increases, the cycle characteristics improve.

The results of the cycle lifespan test performed on Examples 1 to 10 and Comparative Examples 1 to 3 are shown in Table 1.

TABLE 1

| | | Discharge capacity | | |
|---|---|---|---|---|
| | Composition | Primary discharge (mAh/g) | Secondary discharge (mAh/g) | Discharge Capacity Retention |
| Example 1 | $3V_2O_5 \cdot Li_3PO_4$ | 313 | 299 | 95% |
| Example 2 | $4V_2O_5 \cdot Li_3PO_4$ | 348 | 297 | 85% |
| Example 3 | $5V_2O_5 \cdot Li_3PO_4$ | 360 | 321 | 89% |
| Example 4 | $10V_2O_5 \cdot Li_3PO_4$ | 372 | 300 | 81% |
| Example 5 | $95(4V_2O_5 \cdot Li_3PO_4) \cdot 5LiNbO_3$ | 329 | 287 | 87% |
| Example 6 | $95(4V_2O_5 \cdot Li_3PO_4) \cdot 5Li_2MoO_4$ | 351 | 317 | 90% |
| Example 7 | $95(4V_2O_5 \cdot Li_3PO_4) \cdot 5LiBO_2$ | 319 | 304 | 95% |
| Example 8 | $95(4V_2O_5 \cdot Li_3PO_4) \cdot 5Li_2WO_4$ | 323 | 283 | 88% |
| Example 9 | $99(4V_2O_5 \cdot Li_3PO_4) \cdot 1Li_2MoO_4$ | 327 | 315 | 96% |
| Example 10 | $99(4V_2O_5 \cdot Li_3PO_4) \cdot 1Li_2ZrO_3$ | 330 | 315 | 96% |
| Comparative Example 1 | $V_2O_5$ | 384 | 255 | 66% |
| Comparative Example 2 | $2V_2O_5 \cdot Li_3PO_4$ | 281 | 229 | 82% |
| Comparative Example 3 | $95(4V_2O_5 \cdot Li_3PO_4) \cdot 5P_2O_5$ | 218 | 212 | 97% |

Figure 2:
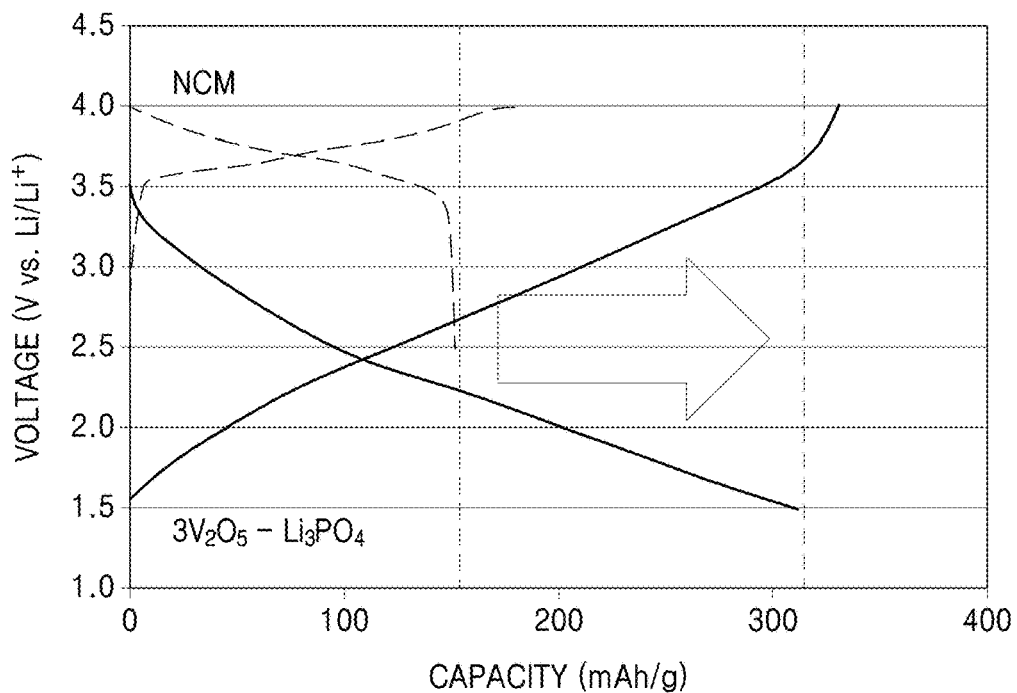
FIG. 2 is a graph of voltage (volts, V, versus Li/Li$^+$) versus capacity (milliampere hours per gram, mAh/g) and shows charge/discharge traces of an all-solid-state secondary battery including a cathode using $3V_2O_5$—$Li_3PO_4$ as a cathode active material according to an embodiment and an all-solid-state secondary battery including a cathode using nickel-cobalt-manganese(NCM) as a cathode active material.

Referring to FIG. 2, the composite oxide having the composition of Example 1 has a high capacity compared to that of NCM, which has been used as a cathode active material in an all-solid-state secondary battery.

Figure 3:
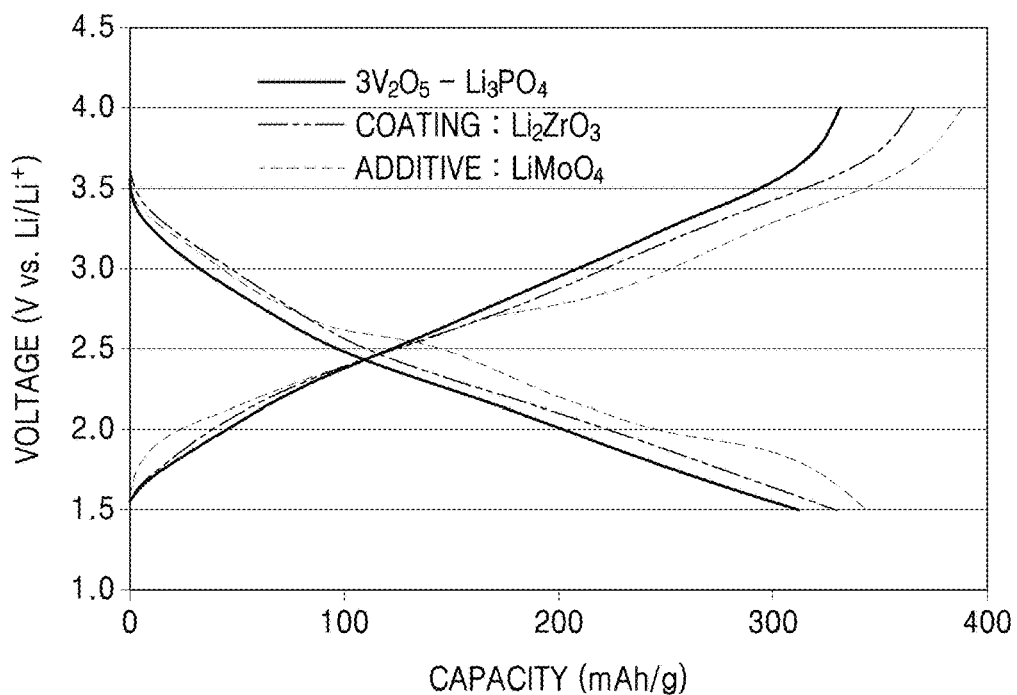
FIG. 3 is a graph of voltage (V versus Li/Li$^+$) versus capacity (mAh/g) and shows charge/discharge traces of all-solid-state secondary batteries including a cathode using $3V_2O_5$—$Li_3PO_4$ as a cathode active material according to an embodiment, a cathode using $3V_2O_5$—$Li_3PO_4$ mixed with $Li_2MoO_4$ as a cathode active material, and a cathode using a cathode active material of $3V_2O_5$—$Li_3PO_4$ having a surface thereof coated with $Li_2ZrO_3$.

In addition, referring to FIG. 3, a capacity of the test cell having $Li_2MoO_4$ added to the first composite oxide as an additive was increased as compared with a capacity of the composite oxide having the composition of Example 1. Moreover, when the composite oxide of Example 1 was coated with Li$_2$ZrO$_3$, the capacity further increased as compared with that of the test cell when the additive was used.

Figure 4:
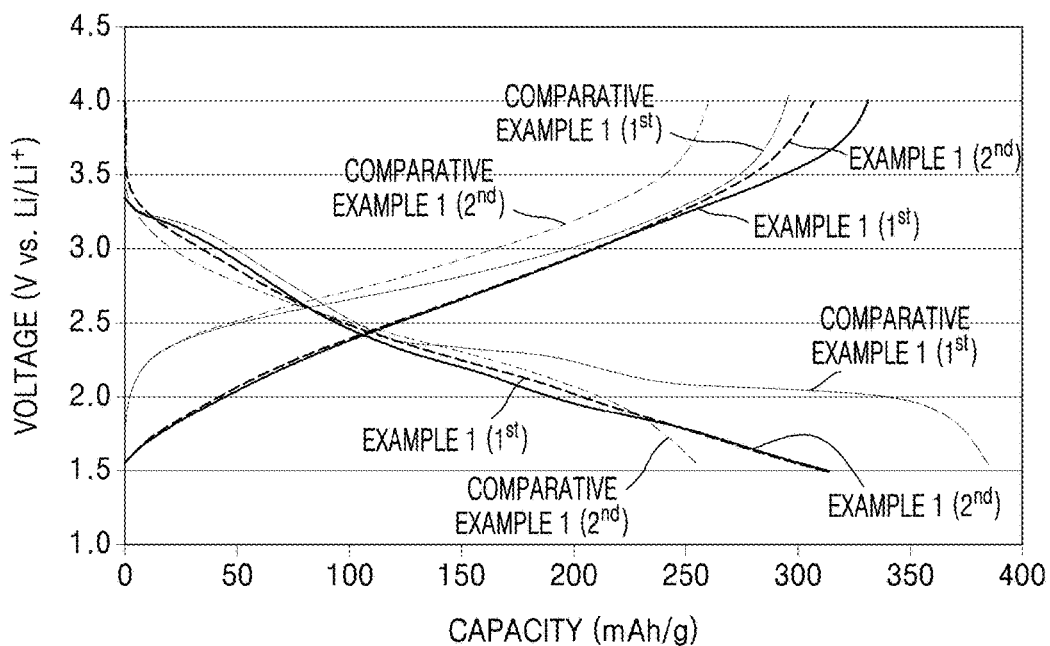
FIG. 4 is a graph of voltage (V versus Li/Li$^+$) versus capacity (mAh/g) and shows charge/discharge traces of Example 1 and Comparative Example 1.
Figure 5:
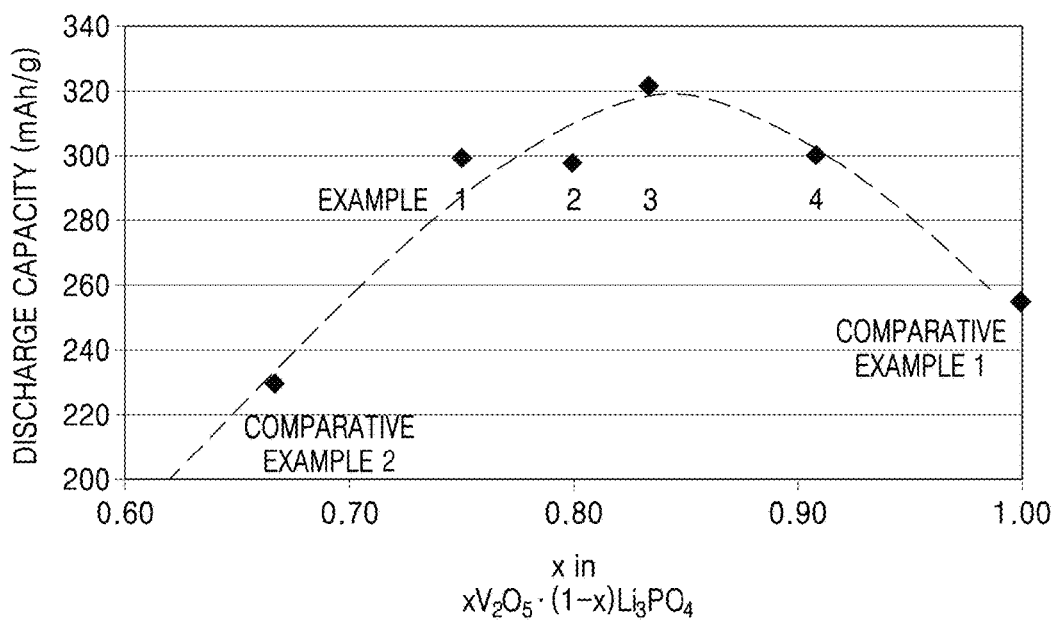
FIG. 5 is a graph of discharge capacity (mAh/g) versus x in the formula $xV_2O_5 \cdot (1-x)Li_3PO_4$ and shows a trace that illustrates the change of a secondary discharge capacity according to a ratio of $V_2O_5$ and $Li_3PO_4$ for Examples 1 to 4 and Comparative Examples 1 and 2.
Figure 6A:
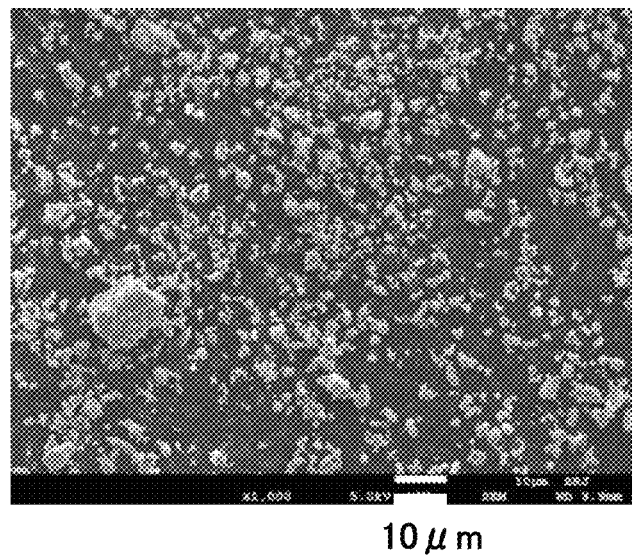
FIGS. 6A and 6B are SEM images of $4V_2O_5 \cdot Li_3PO_4$ in the cathode active material according to an embodiment.
Figure 6B:
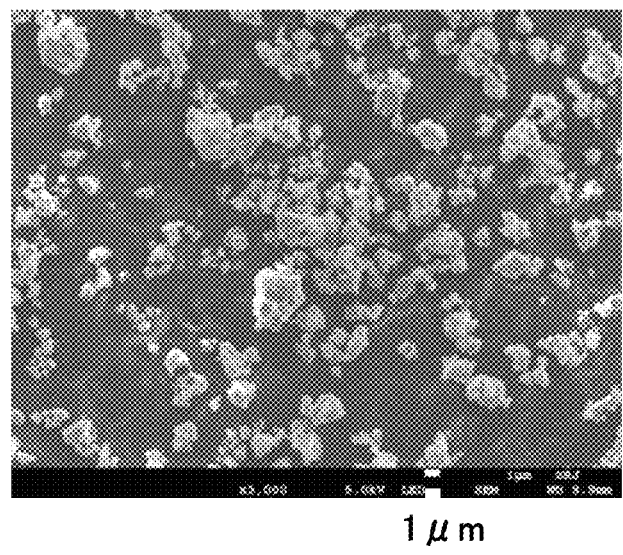

Referring to Examples 1 to 4, Comparative Examples 1 and 2, FIGS. 4 and 5, and Table 1, the discharge capacity retentions were significantly improved in cases when a composite oxide of vanadium pentoxide and lithium phosphate were used as compared with those of cases in which vanadium pentoxide was used alone. Particularly, when a molar ratio of vanadium pentoxide to lithium phosphate was greater than 2:1, the discharge capacity retentions significantly improved.

In addition, according to Examples 5 to 9, some of the composite oxides of vanadium pentoxide and lithium phosphate were substituted with lithium metal oxides, and thus the discharge capacity retentions were further improved as compared with those of the composite oxides.

Further, according to Example 10 and Comparative Example 3, when a zirconium coating layer is formed on the composite oxide of vanadium pentoxide and lithium phosphate, high capacity characteristics of the composite oxide were maintained, and a discharge capacity retention equivalent to that when diphosphorus pentoxide was added was achieved.

In conclusion, when an all-solid-state secondary battery uses a cathode including the cathode active material according to an embodiment and a sulfide-based solid electrolyte, the all-solid-state secondary battery may have high capacity and high lifespan characteristics.

As described above, according to an embodiment, discharge capacity and cycle characteristics of an all-solid-state secondary battery using a solid electrolyte layer including a sulfide-based solid electrolyte may improve due to a cathode active material including a first composite oxide of an embodiment.

It should be understood that an embodiment described herein should be considered in a descriptive sense only and not for purposes of limitation. Descriptions of features or aspects within each embodiment should typically be considered as available for other similar features or aspects in another embodiment.

While one or more embodiments have been described with reference to the figures, it will be understood by those of ordinary skill in the art that various changes in form and details may be made therein without departing from the spirit and scope as defined by the following claims.

What is claimed is:

1. A cathode active material comprising:
a first composite oxide represented by Formula (1):

$$xV_2O_5 \cdot Li_3PO_4 \quad (1)$$

wherein, in Formula (1), x satisfies 2<x≤10.

2. The cathode active material of claim 1, further comprising a compound represented by Formula (1A):

$$Li_aM_bO_c \quad (1A)$$

wherein, in Formula (1A), M is a Group 3 to Group 15 element or a combination comprising at least one of a Group 3 to Group 15 element, and a, b, and c respectively satisfy 1≤a≤2, 0<b≤1, and 1<c≤4.

3. The cathode active material of claim 1, wherein the cathode active material further comprises a compound of the formula Li$_a$M$_b$O$_c$, a content of which is represented by Formula (2):

$$y(xV_2O_5 \cdot Li_3PO_4) \cdot (100-y)Li_aM_bO_c \quad (2)$$

wherein, in Formula (2), M is a Group 3 to Group 15 element or a combination comprising at least one of a Group 3 to Group 15 element, and x, y, a, b, and c respectively satisfy 2<x≤10, 95≤y<100, 1≤a≤2, 0<b≤1, and 1<c≤4.

4. The cathode active material of claim 3, wherein in Formula (2), M comprises B, Zr, Nb, Mo, W, or a combination thereof.

5. The cathode active material of claim 3, wherein Formula (2) is y(xV$_2$O$_5$·Li$_3$PO$_4$)·(100-y)LiNbO$_3$, y(xV$_2$O$_5$·Li$_3$PO$_4$)·(100-y)Li$_2$MoO$_4$, y(xV$_2$O$_5$·Li$_3$PO$_4$)·(100-y)LiBO$_2$, y(xV$_2$O$_5$·Li$_3$PO$_4$)·(100-y)Li$_2$WO$_4$, or y(xV$_2$O$_5$·Li$_3$PO$_4$)·(100-y)Li$_2$ZrO$_3$, wherein x and y respectively satisfy 2<x≤10 and 95≤y<100.

6. The cathode active material of claim 3, wherein Formula (2) is 95(4V$_2$O$_5$·Li$_3$PO$_4$)·5LiNbO$_3$, 95(4V$_2$O$_5$·Li$_3$PO$_4$)·5Li$_2$MoO$_4$, 95(4V$_2$O$_5$·Li$_3$PO$_4$)·5LiBO$_2$, 95(4V$_2$O$_5$·Li$_3$PO$_4$)·5Li$_2$WO$_4$, 99(4V$_2$O$_5$·Li$_3$PO$_4$)·1Li$_2$MoO$_4$, or 99(4V$_2$O$_5$·Li$_3$PO$_4$)·1Li$_2$ZrO$_3$.

7. The cathode active material of claim 1, further comprising a third composite oxide, the third composite oxide comprising:
a core; and
a coating layer disposed on the core,
wherein the core comprises the first composite oxide represented by Formula (1), and
wherein the coating layer comprises a Group 3 to Group 15 element.

8. The cathode active material of claim 7, wherein the coating layer comprises B, Zr, Nb, Mo, W, or a combination thereof.

9. The cathode active material of claim 7, wherein an amount of the coating layer is in a range of about 0.1 weight percent to about 10 weight percent, based on a total weight of the third composite oxide.

10. The cathode active material of claim 7, wherein the coating layer comprises a compound represented by Formula (1B):

$$Li_aM_bO_c \quad (1B)$$

wherein, in Formula (1B), M is a Group 3 to Group 15 element or a combination comprising at least one of a Group 3 to Group 15 element, and a, b, and c respectively satisfy 1≤a≤2, 0<b≤1, and 1<c≤4.

11. The cathode active material of claim 10, wherein M comprises B, Zr, Nb, Mo, W, or a combination thereof.

12. The cathode active material of claim 10, wherein the coating layer comprises LiNbO$_3$, Li$_2$MoO$_4$, LiBO$_2$, Li$_2$WO$_4$, Li$_2$ZrO$_3$, or a combination thereof.

13. The cathode active material of claim 1, wherein an average particle diameter of the first composite oxide is in a range of about 0.1 micrometer to about 10 micrometers.

14. The cathode active material of claim 1, wherein a discharge capacity of the first composite oxide is 270 milliamperes per gram or greater, when determined in a lithium battery on a second cycle.

15. An all-solid-state secondary battery comprising:
a cathode comprising the cathode active material of claim 1;
an anode; and
a solid electrolyte layer disposed between the cathode and the anode.

16. The all-solid-state secondary battery of claim 15, wherein the solid electrolyte layer comprises a solid electrolyte,
wherein the solid electrolyte comprises S, Li, and Si, P, B, or a combination thereof.

17. A method of preparing the cathode active material of claim 1, the method comprising:
   contacting vanadium oxide and lithium phosphoric acid to prepare a mixture; and
   milling the mixture to obtain a composite oxide to prepare the cathode active material.

18. The method of claim 17, wherein the vanadium oxide and lithium phosphoric acid are contacted at a molar ratio in a range of greater than about 2:1 to about 10:1 or less.

19. The method of claim 17, wherein the mixture further comprises a compound represented by Formula (1A):

$$Li_aM_bO_c \tag{1A}$$

wherein, in Formula (1A), M is a Group 3 to Group 15 element or a combination comprising at least one of a Group 3 to Group 15 element, and a, b, and c respectively satisfy $1 \leq a \leq 2$, $0 < b \leq 1$, and $1 < c \leq 4$.

20. The method of claim 17, further comprising:
contacting a coating solution and the composite oxide,
   wherein the coating solution comprises a compound of Formula (1B):

$$Li_aM_bO_c \tag{1B},$$

wherein, in Formula (1B), M is a Group 3 to Group 15 element or a combination comprising at least one of a Group 3 to Group 15 element, and a, b, and c respectively satisfy $1 \leq a \leq 2$, $0 < b \leq 1$, and $1 < c \leq 4$, to obtain a mixed solution; and
drying and heat-treating the mixed solution under oxidative conditions to obtain a $Li_aM_bO_c$—coated composite oxide.

* * * * *